United States Patent
Liu et al.

(10) Patent No.: US 8,320,054 B2
(45) Date of Patent: Nov. 27, 2012

(54) ZOOM PROJECTION LENS SYSTEM

(75) Inventors: Xiao-Na Liu, Shenzhen (CN); Hai-Jo Huang, Tu-Cheng (TW); Fang-Ying Peng, Tu-Cheng (TW); Sheng-An Wang, Tu-Cheng (TW); An-Tze Lee, Tu-Cheng (TW)

(73) Assignees: Premier Image Technology(China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 73 days.

(21) Appl. No.: 13/092,971

(22) Filed: Apr. 24, 2011

(65) Prior Publication Data

US 2012/0182626 A1 Jul. 19, 2012

(30) Foreign Application Priority Data

Jan. 19, 2011 (CN) .......................... 2011 1 0022156

(51) Int. Cl.
*G02B 15/14* (2006.01)

(52) U.S. Cl. ........................................ 359/691; 359/682

(58) Field of Classification Search .................. 359/676, 359/682, 691
See application file for complete search history.

(56) References Cited

U.S. PATENT DOCUMENTS

| 6,088,169 | A | * | 7/2000 | Ohno | 359/682 |
| 7,626,764 | B2 | | 12/2009 | Lin et al. | |
| 2005/0141100 | A1 | * | 6/2005 | Kojima et al. | 359/691 |

FOREIGN PATENT DOCUMENTS

CN 101387736 A 3/2009

* cited by examiner

*Primary Examiner* — Alicia M Harrington
(74) *Attorney, Agent, or Firm* — Altis Law Group, Inc.

(57) ABSTRACT

A zoom projection lens system includes a first lens group with negative refraction power and a second lens group with positive refraction power. The first lens group includes a first lens with negative refraction power. The second lens group includes a second lens with positive refraction power, a third lens with positive refraction power, a fourth lens with negative refraction power, and a fifth lens with positive refraction power. The zoom projection lens system satisfies the following formulas: $1.9<|F1/Fw|<2.1$, $0.5<|f4/Fw|<0.8$, $0.95<|f5/Fw|<1.2$, where "F1", "f4" and "f5" are respectively the effective focal lengths of the first lens group, the fourth lens and the fifth lens, "Fw" is the effective focal lengths of the zoom projection lens system in the wide angle state.

7 Claims, 10 Drawing Sheets

ZOOM PROJECTION LENS SYSTEM

BACKGROUND

1. Technical Field

The disclosure relates to zoom projection lens systems and, particularly, to a zoom projection lens system with a high resolution and a short overall length.

2. Description of Related Art

In order to obtain a clear image yet reduce the size of a projector, a zoom projection lens system with high resolution and short overall length is needed. However, there are obstacles to obtaining both a short overall length and a high resolution. For example, reducing the number of lenses usually shortens the overall length of the zoom projection lens system, but resolution of the zoom projection lens system will suffer. Conversely, increasing the number of lenses of the zoom projection lens system usually increases resolution, but the overall length system is increased.

Therefore, it is desirable to provide a zoom projection lens system, which can overcome the above-mentioned obstacles.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will now be described in detail with reference to the drawings.

Figure 1:
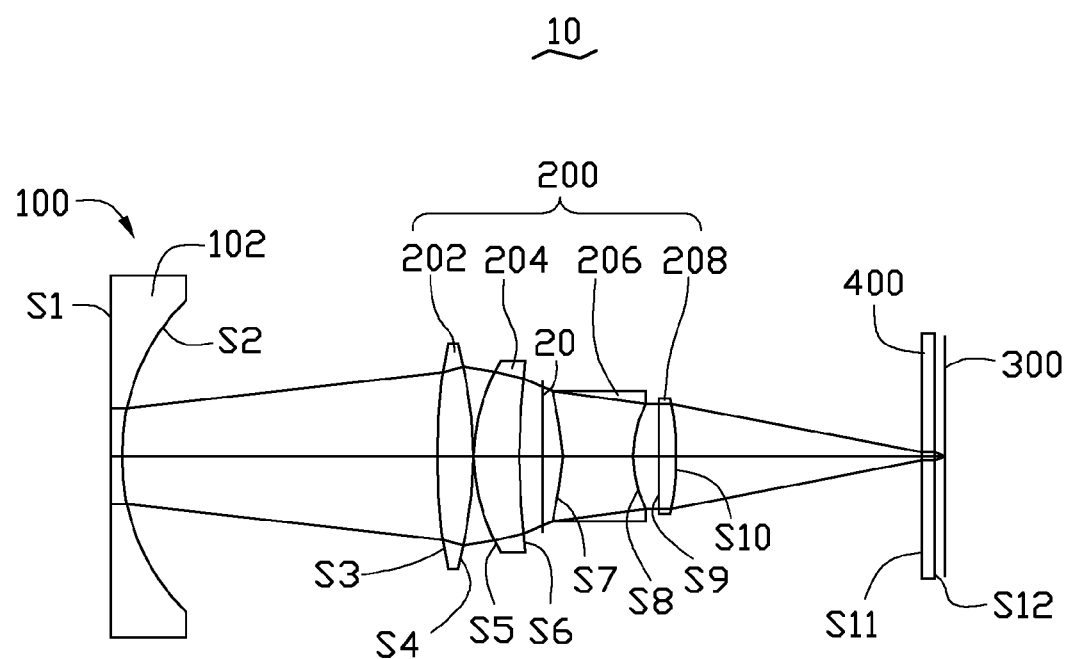
FIG. 1 is a schematic view of a zoom projection lens system when the zoom projection lens system is in a wide angle state, in accordance with an embodiment.
Figure 2:
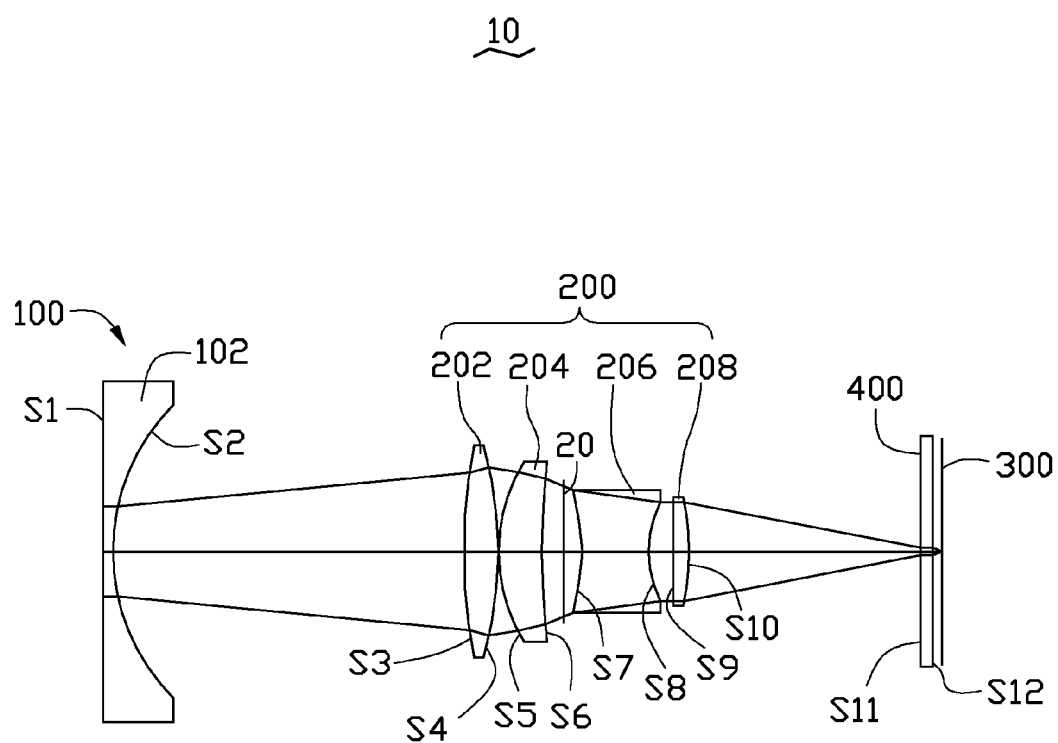
FIG. 2 is a schematic view of the zoom projection lens system of FIG. 1 in a telephoto state.

Referring to FIGS. 1 and 2, a zoom projection lens system 10, according to an embodiment, is shown. The system 10 includes, in order from the magnified end to the minified end thereof, a first lens group 100 with negative refraction power and a second lens group 200 with positive refraction power. An imaging plane 300 is positioned at the minified end of the system 10.

The first lens group 100 includes a first lens 102 with negative refraction power. The first lens 102 includes a first surface S1 with positive refraction power, facing the magnified end, and a second surface S2 with negative refraction power, facing the minified end.

The second lens group 200 includes, in the order from the magnified end to the minified end of the system 10, a second lens 202 with positive refraction power, a third lens 204 with positive refraction power, a fourth lens 206 with negative refraction power, and a fifth lens 208 with positive refraction power. The second lens 202 includes a third surface S3 with positive refraction power, facing the magnified end, and a fourth surface S4 with positive refraction power, facing the minified end. The third lens 204 includes a fifth surface S5 with positive refraction power, facing the magnified end, and a sixth surface S6 with negative refraction power, facing the minified end. The fourth lens 206 includes a seventh surface S7 with negative refraction power, facing the magnified end, and a eighth surface S8 with negative refraction power, facing the minified end. The fifth lens 208 includes a ninth surface S9 with negative refraction power, facing the magnified end, and a tenth surface S10 with positive refraction power, facing the minified end.

The system 10 can be used in a digital light processing (DLP) projector. In operation, a spatial light modulator (SLM) of the DLP projector modulates light to the system 10, the light in turn goes through the second lens group 200 and the first lens group 100 and is eventually projected onto a screen. In the present embodiment, when the system 10 switches from a wide angle state to a telephoto state, the first lens group 100 and the second lens group 200 all move along the optical axis of the system 10, and the system 10 a achieves 1.1× zoom. The surfaces of all the lenses employed in the system 10 are spherical.

To ensure the system 10 has a short overall length and a high resolution, the system 10 is set to satisfy the following formulas:

$$1.9 < |F1/Fw| < 2.1, \quad (1)$$

$$0.5 < |f4/Fw| < 0.8, \text{ and} \quad (2)$$

$$0.95 < |f5/Fw| < 1.2. \quad (3)$$

In the formulas (1) to (3), F1, f4, and f5 respectively designate the effective focal lengths of the first lens group 100, the fourth lens 206 and the fifth lens 208. "Fw" is the effective focal length of the system 10 in the wide angle state. The formula (1) ensures that the overall length of the system 10 is short. The formulas (2) and (3) favorably limit the spherical aberration and the field curvature occurring in the system 10.

To limit the zoom ratio (the ratio of the effective focal length of the system 10 in the telephoto state to that in the wide angle state) of the system 10, the system 10 further satisfies the formula:

$$L*\Phi w < 3.8. \quad (4)$$

In the formula (4), "L" is the overall length of the system 10 in the wide angle state, and "Φw" is the refraction power of the system 10 in the wide angle state.

To provide good image quality of the system 10, the system 10 further satisfies the formula:

$$w \geq 27° \quad (5)$$

In the formula (5), "w" is half the field angle of the system 10 in the wide angle state.

To further enhance image quality of the system 10, the system 10 further includes an aperture stop 20 and a glass cover 400. The aperture stop 20 is arranged between the third lens 204 and the fourth lens 206. The glass cover 400 is arranged next to the imaging plane 300. The aperture stop 20 is configured for adjusting light flux from the fourth lens 206 to the third lens 204, to correct coma aberrations of the system 10. The aperture stop 20 moves with the second lens group 200 and the aperture value of the aperture stop 20 remains constant. The glass cover 400 includes an eleventh surface S11 facing the magnified end and a twelfth surface S12 facing the minified end. The glass cover 400 is configured to protecting the system 10.

Detailed examples of the system 10 are given below. But it should be noted that the system 10 is not limited to the example. In the present embodiment, F1=−44.5, f4=−14.675, f5=23.96, Fw=22.1, L=83 mm, Φw=0.045, and w=26.95°.

Table 1 shows the lens data of the present example. Table 2 lists the distance between each lens group when the system 10 is at the wide angel state and the telephoto state. Listed below are the symbols used in Tables 1 and 2:

R: radius of curvature;
D: distance between two adjacent lens surfaces along the optical axis of the system 10, wherein the unit is millimeter;
Nd: refractive index of lens with respect to the d light;
Vd: Abbe constant;
Conic: coin constant;
F: effective focal length;
D1: distance on the optical axis between the second surface S2 and the third surface S3;
D2: distance on the optical axis between the tenth surface S10 and the imaging plane 300;
L: overall length; and
F#: fnumber.

TABLE 1

| Lens surfaces | Type | R | D | nd | Vd |
|---|---|---|---|---|---|
| S1 | Spherical | 672.066 | 1.388 | 1.4874 | 70.44 |
| S2 | Spherical | 21.065 | — | — | — |
| S3 | Spherical | 134.11 | 2.775 | 1.62 | 60.34 |
| S4 | Spherical | −35.57 | 0.161 | — | — |
| S5 | Spherical | 17.81 | 4.199 | 1.696 | 55.45 |
| S6 | Spherical | 77.884 | 2.146 | — | — |
| Aperture stop | — | Infinity | 1.6571 | — | — |
| S7 | Spherical | −38.69 | 6.852 | 1.728 | 28.32 |
| S8 | Spherical | 16.036 | 2.149 | — | — |
| S9 | Spherical | 106.964 | 1.615 | 1.62 | 60.34 |
| S10 | Spherical | −17.236 | — | — | — |
| S11 | — | Infinity | 1.05 | 1.487 | 70.44 |
| S12 | — | Infinity | 1.11 | — | — |
| Imaging plane | — | Infinity | — | — | — |

TABLE 2

| state | F | D1 | D2 | L | F# |
|---|---|---|---|---|---|
| Wide angle state | 22.1 | 35.075 | 22.82 | 83 | 2.4 |
| Telephoto state | 24.27 | 30.43 | 24.168 | 79.7 | 2.59 |

Figure 3:
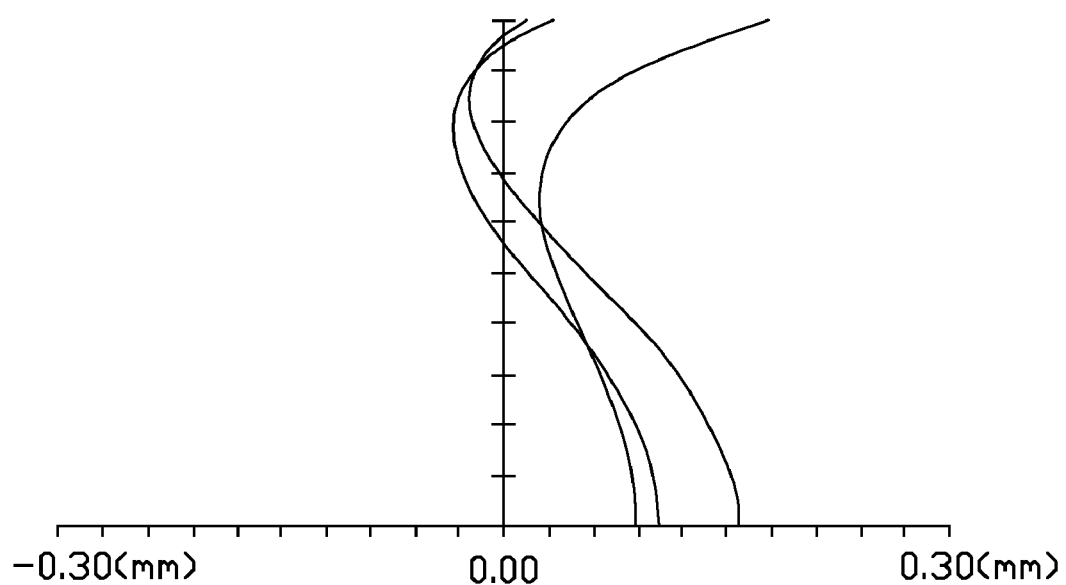
FIGS. 3-6 are graphs respectively showing spherical aberration, field curvature, distortion, and lateral chromatic aberration occurring in the zoom projection lens system of FIG. 1 when the zoom projection lens system is in the wide angle state.
Figure 4:
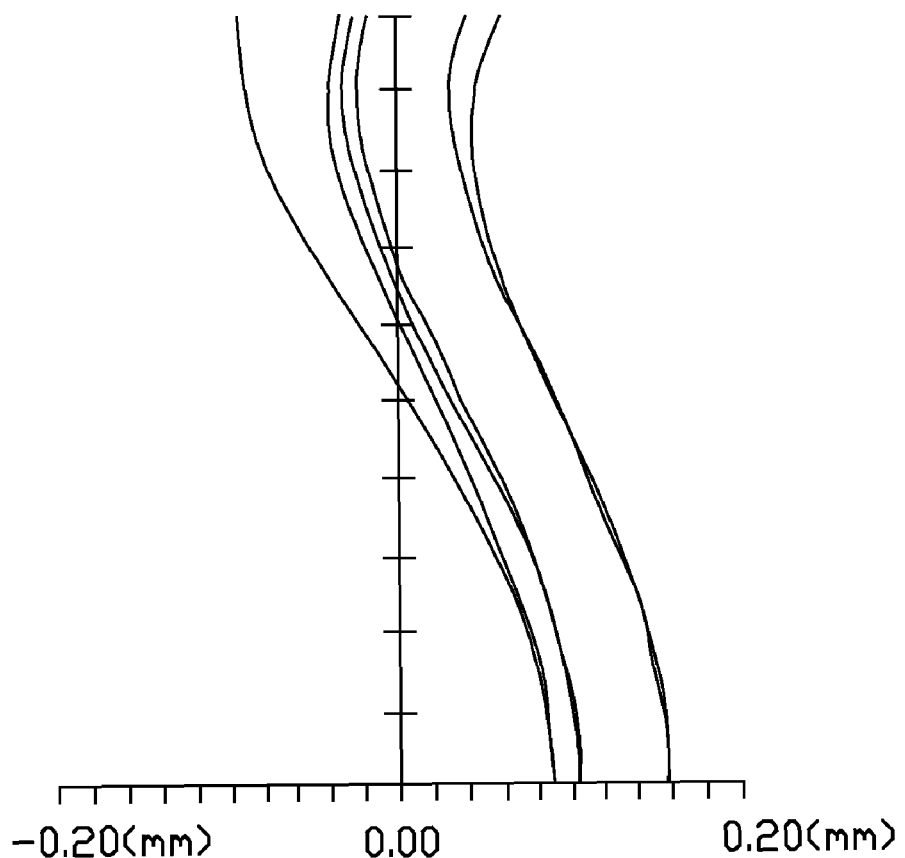
Figure 5:
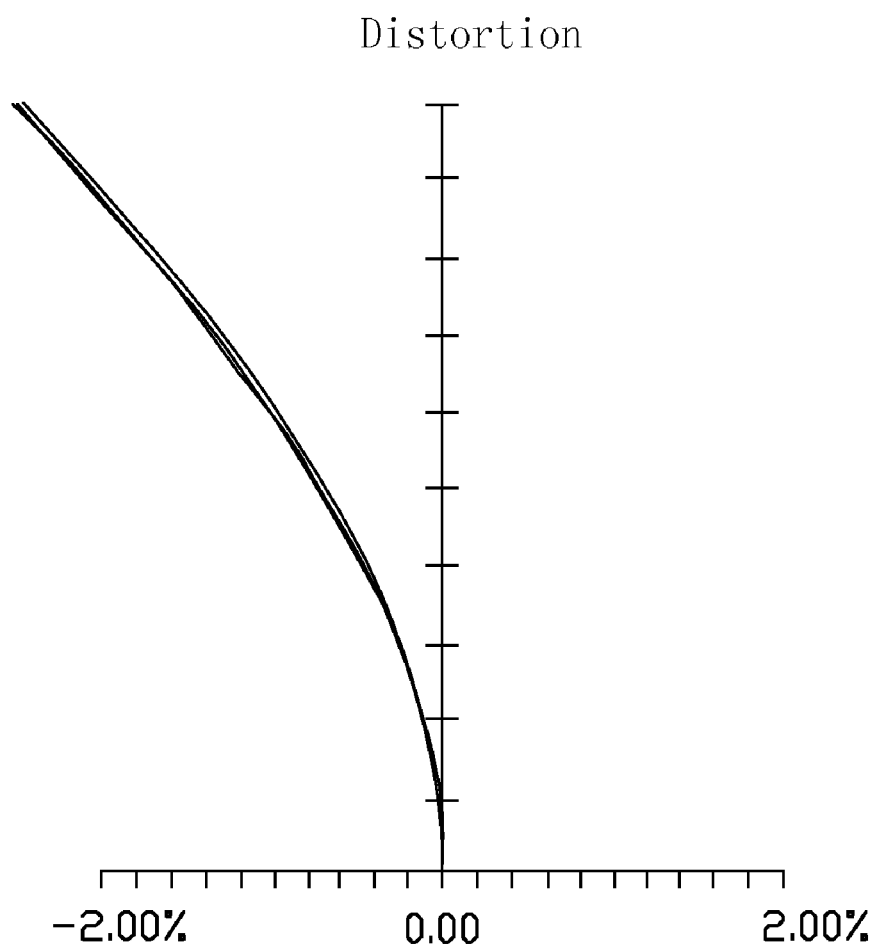
Figure 6:
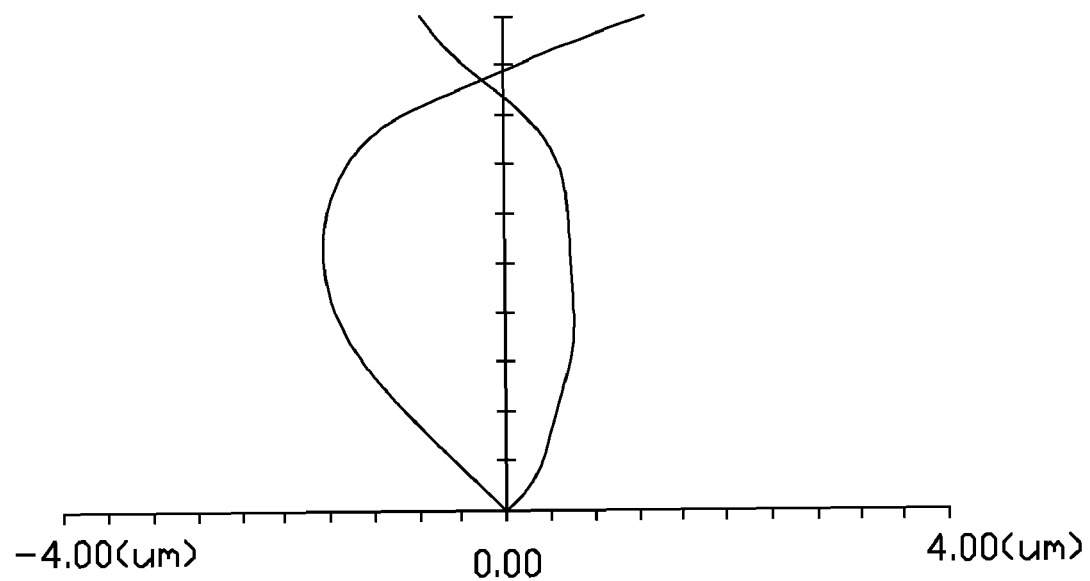
Figure 7:
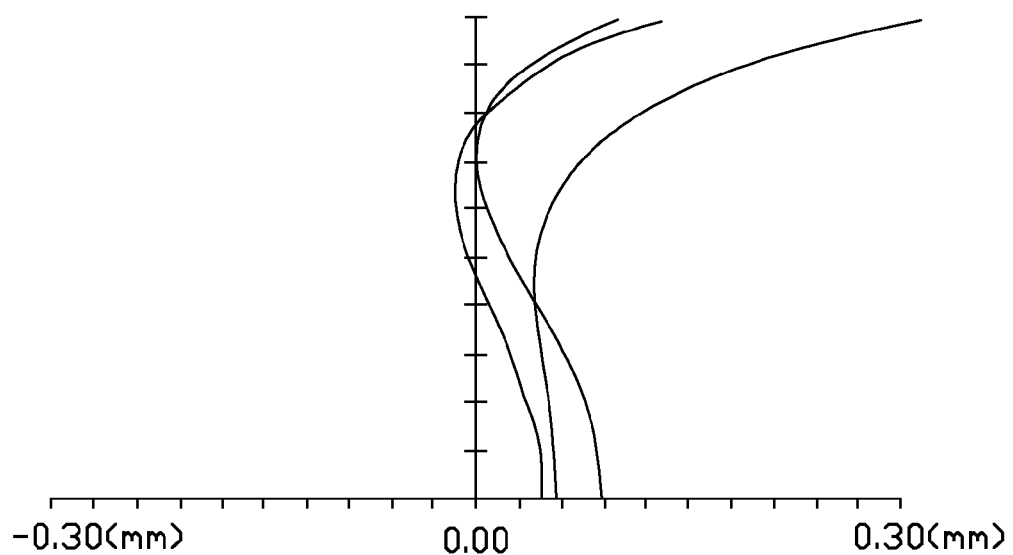
FIGS. 7-10 are graphs respectively showing spherical aberration, field curvature, distortion, and lateral chromatic aberration occurring in the zoom projection lens system of FIG. 1 when the zoom projection lens system is in the telephoto state.
Figure 8:
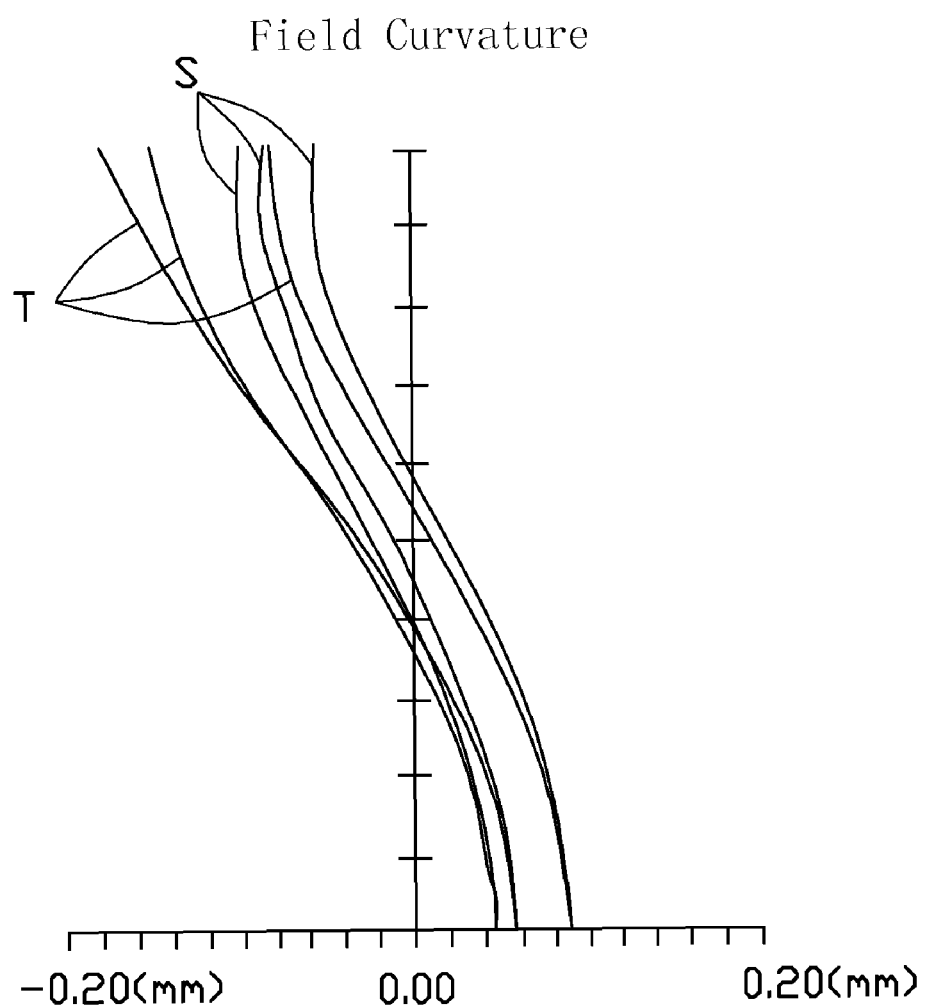
Figure 9:
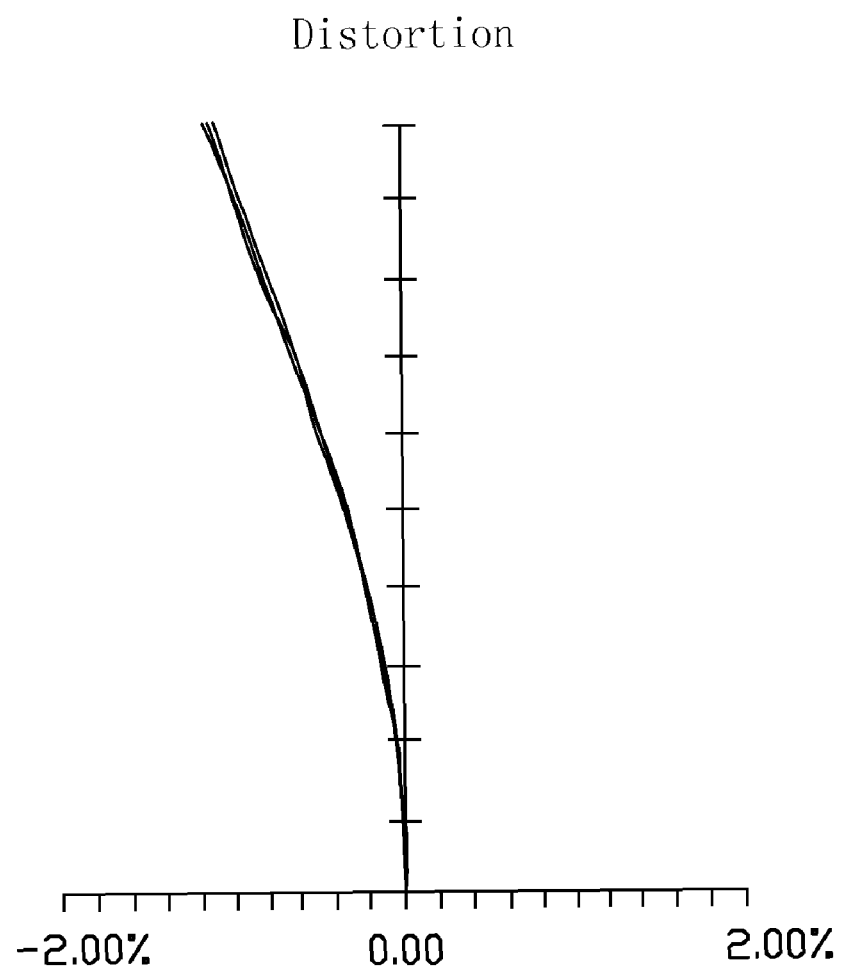
Figure 10:
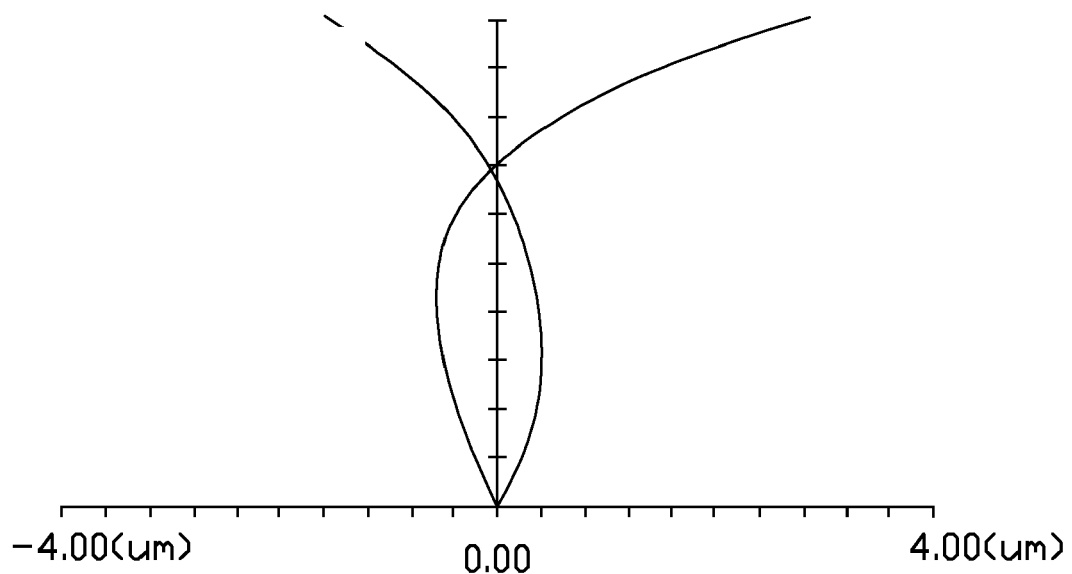

The spherical aberration, field curvature, distortion, and lateral chromatic aberration of the system 10 when it is in the wide angle state, and when in the telephoto state, are shown in FIGS. 3-10. Referring to FIGS. 3 and 7, the spherical aberration of the system 10 is between −0.3 mm to 0.3 mm. Referring to FIGS. 4 and 8, the tangential field curvature and the sagittal field curvature of the system 10 is between −0.3 mm to 0.3 mm. Referring to FIGS. 5 and 9, the distortion of the system 10 is between −2% to 0. Referring to FIGS. 6 and 10, the lateral chromatic aberration of the system 10 is between −4 μm~4 μm.

It will be understood that the above particular embodiments is shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A zoom projection lens system, in order from an magnified end to an minified end thereof, comprising:
    a first lens group with negative refraction power, wherein the first lens group comprising a first lens with negative refraction power; and
    a second lens group with positive refraction power, wherein the second lens group, in order from an magnified end to an minified end of the zoom projection lens system, comprises a second lens with positive refraction power, a third lens with positive refraction power, a fourth lens with negative refraction power, and a fifth lens with positive refraction power;
    wherein the zoom projection lens system satisfies the following formulas:

$$1.9 < |F1/Fw| < 2.1, \quad (1)$$

$$0.5 < |f4/Fw| < 0.8, \quad (2)$$

$$0.95 < |f5/Fw| 1 < 1.2, \quad (3)$$

where "F1", "f4" and "f5" are respectively the effective focal lengths of the first lens group, the fourth lens and the fifth lens, "Fw" is the effective focal lengths of the zoom projection lens system in the wide angle state.

2. The zoom projection lens system of claim 1, further satisfying the formula: L*Φw<3.8, wherein "L" is the overall length of the zoom projection lens system in the wide angle state, "Φw" is the refraction power of the zoom projection lens system in the wide angle state.

3. The zoom projection lens system of claim 1, further satisfying the formula: w≧27°, wherein "w" is half the filed angle of the zoom projection lens system in the wild angle state.

4. The zoom projection lens system of claim 1, further comprising an aperture stop arranged between the third lens and the fourth lens.

5. The zoom projection lens system of claim 4, wherein the aperture stop is capable of moving with the second lens group and the aperture of the aperture stop remain constant.

6. The zoom projection lens system of claim 1, further comprising a glass cover between the second lens group and an imaging plane of the zoom projection lens system.

7. The zoom projection lens system of claim 1, wherein the surfaces of all the lenses employed in the zoom projection lens system are spherical.

* * * * *